… …

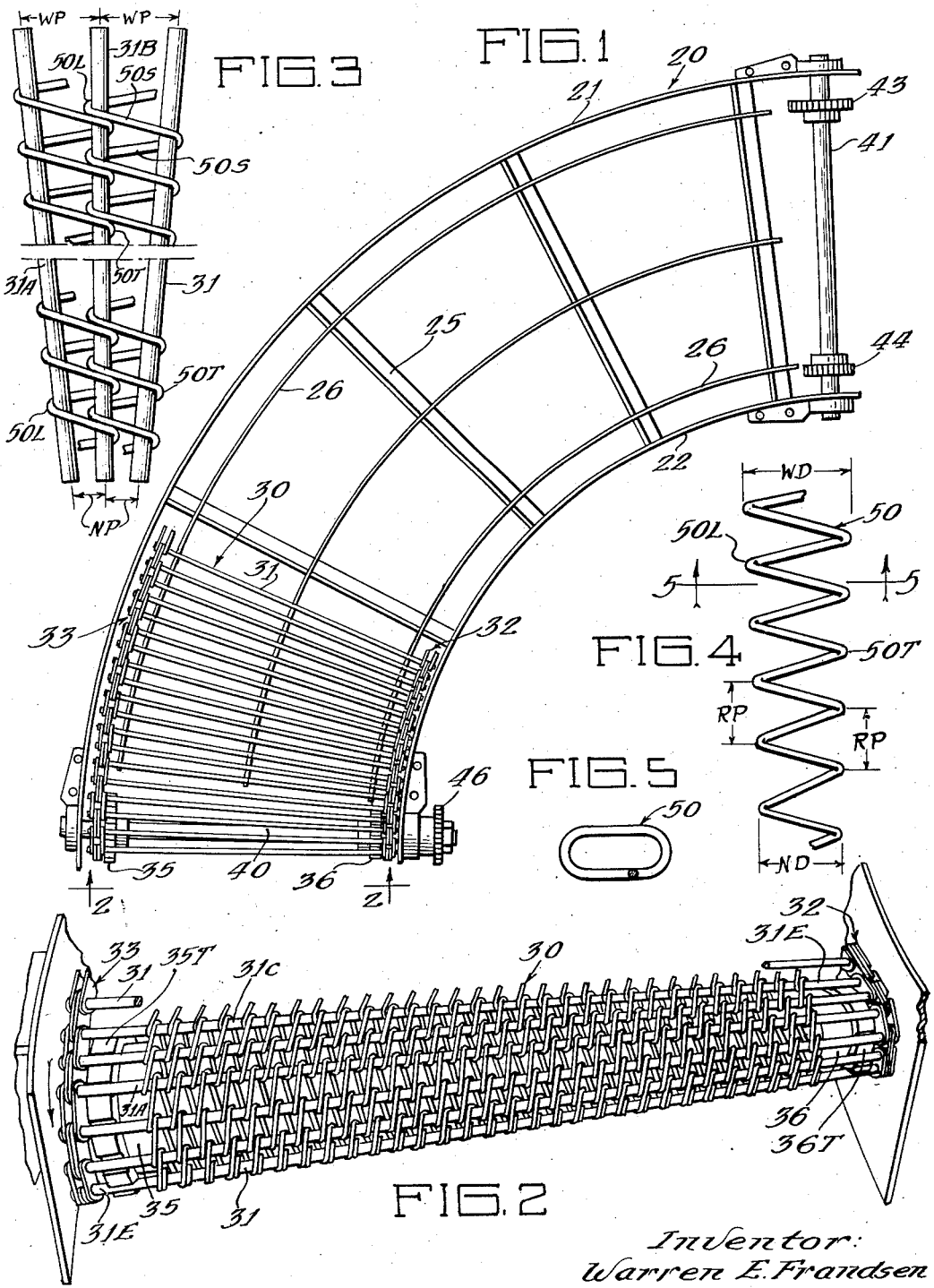

United States Patent Office 2,855,091

Patented Oct. 7, 1958

2,855,091

CONVEYORS

Warren E. Frandsen, Chicago, Ill., assignor to Voss Belting & Specialty Company, Chicago, Ill., a corporation of Illinois Application August 2, 1956, Serial No. 601,722

1 Claim. (Cl. 198—182)

This invention relates to conveyors.

The present invention pertains primarily to a conveyor which is adapted to handle relatively small articles, and the kind of conveyor entailed is one wherein transverse rods are extended between flexible bands of the usual kind, since a conveyor of this particular construction has proven to be highly satisfactory from an operational standpoint, particularly in respect of accurate timing of the conveyor which is important under many circumstances. It is advantageous from a production standpoint to furnish conveyors of this kind with transverse rods having a predetermined pitch or spacing between the rods, but in those instances where the articles being conveyed have at least one dimension less than the pitch spacing between the rods there is a likelihood of the articles dropping through the conveyor. This is particularly so at bends or turns along the conveyor path, since under this circumstance the turn portion of the conveyor is constructed so that the pitch distance between the rods varies from a minimum at the inner circumference to a maximum at the outer circumference. Thus, the likelihood of articles dropping through a conveyor of the foregoing construction is particularly acute in the neighborhood of the outer circumference of a turn.

Adptation of conveyors of widely different construction for handling small articles has been a recognized problem in the art for a long time, and there have been numerous ways suggested for overcoming the problem. One approach has been to provide wire mesh structure between flat rods of a conveyor, but this particular construction operates best only on straight flights, and the timing problem remains acute.

As to conveyor turns, it has been suggested that coil springs be extended between transverse rods of a conveyor, but these do not afford the strength that is sometimes required, and additionally complications of assemblage and in operation have been observed. For instance, the assemblage entails numerous springs, as many as about fifteen for each rod in some instances, and these must be individually mounted. Were a spring to break in operation, the repair is complicated and time-consuming.

In applications combining straight and curved conveyor runs, it has been proposed heretofore to use interlinked crimped rods or wires which are adapted to "give" one relative to another at the turn so as in effect to stretch at the outer circumference of the turn and shrink at the inner circumference. Installations of this kind involve highly specialized assemblies and subassemblies, accurate timing is not possible in many instances, the conveyor belt is not particularly stable, and the driving structure is non-standard.

It will thus be seen that while the particular problem mentioned has long confronted the art, the proposals for overcoming the problem have entailed in some instances sacrifice of parts which lend rigidity and accuracy of timing to the conveyor, and in other instances have produced expensive assemblages such as bands or coil springs and the introduction of non-standard parts. Under the present invention, desirable transverse rod structure is utilized in a conveyor turn which enables accurate timing of the conveyor to be accomplished as well as firm supporting belt structure to be afforded, and individual wire helices or spirals of a relatively rigid nature are so mounted on the rods as to accommodate the conveyance of small articles. Such advantageous relations are attained in a relatively simple fashion without attendant objectionable expense and discard of standard parts for non-standard parts, and such constitutes the primary object of the present invention.

Specifically, the object of the present invention is to afford a belt for a conveyor turn comprising transverse rods that extend between the inner and outer flexible bands, and to mount on the rods spiral wires which are configured complementally to the variation in pitch of the rods between the inner and outer circumference of the turn. Another object of the present invention is to enable the foregoing to be accomplished together with timing accuracy, and to assure that relatively tight wire mesh structure is provided for the belt.

Other and further objects of the present invention will be apparent from the following description and claims and are illustrated in the accompanying drawing which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a top plan view, broken away in part, showing a conveyor turn of the kind contemplated by the present invention;

Fig. 2 is an end perspective of the conveyor turn on an enlarged scale;

Fig. 3 is a plan view, partly diagrammatic, showing the relation between the transverse rods of the conveyor and the spiral wires that are mounted thereon;

Fig. 4 is a detail view of a spiral wire; and

Fig. 5 is a sectional view taken substantially on the line 5—5 of Fig. 4.

In Fig. 1 there is shown a 90° conveyor turn which is typical of the kind of installation involved in the present instance. It will be appreciated that the conveyor turn 20 is exemplary of but one embodiment of the invention, since the invention may be embodied as well in conveyor turns of various degrees as well as ascending and descending spiral flights.

The conveyor turn 20 in the present instance embodies a pair of arcuate side plates 21 and 22 these being respectively at the outer and inner circumferences of the turn. The side plates 21 and 22 are supported at the desired level by leg structure (not shown) so that the respective ends of the turn are disposed at the desired level in association with either a straight companion conveyor or a related conveyor turn so as to transport the articles being conveyed along the desired path.

The side plates 21 and 22 are braced by transverse angle bars 25 of the usual kind, and arcuate relatively narrow bearing strips 26 are afforded at desired radius points between the side plates 21 and 22 to support the conveyor belt or flight 30.

The conveyor belt 30 is one that is defined generally by a plurality of transverse rods 31 of circular cross-section. These rods are connected at their inner ends to a flexible band 32 and at their outer ends to a flexible band 33. The bands 32 and 33 may be of any desired construction affording sufficient support for the rods 31, and in the present instance these have been shown as chains of a well known link construction. Thus, the rods 31 have reduced ends affording pintles, and the pintles are loosely journalled in openings afforded in the links of the chain so that the conveyor belt 30 is capable of accurate turning at the end points without binding.

The belt 30 is powered by drive sprockets 35 and 36 having teeth 35T and 36T, as shown particularly in Fig. 2, adapted to drivingly engage the conveyor belt 30 at spaces between the rods 31. Because a turn is entailed, the rods 31 vary in spacing say from a wide pitch WP, Fig. 3, representative of the outer circumference of the turn to a narrow pitch spacing NP representative of the inner circumference of the turn. The diameter of the drive sprocket 35 is of accordingly larger diameter than the drive sprocket 36, and the teeth 35T and 36T are accordingly differently spaced and dimensioned on the respective sprockets in order to drivingly engage the rods 31 in an effective and accurately timed manner.

The drive sprockets 35 and 36 are carried on a drive shaft 40, Fig. 1, which it will be observed is at a slight pitch angle necessitated by the differently sized sprockets. A similarly pitched idler shaft 41 having idler sprockets 43 and 44 is arranged for rotation at the opposite end of the conveyor, and the belt 30 of course is arranged as an endless unit about the two sets of sprockets. Power is imparted to the drive shaft 40 through a drive sprocket 46, Fig. 1, and the sprocket 46 is adapted to be driven by a motor (not shown).

It will be observed in Fig. 1 that the space between the rods 31 toward the outer circumference of the turn is of a relatively large order in comparison to the more narrow spacing that is established at the inner circumference of the turn. It will be recognized that in those instances where small articles are being conveyed there is a likelihood for these to drop through the wider spaces at the outer circumference of the turn. Under the present invention, this problem is overcome by mounting on the rods 31 helical or spiral wires 50 of the kind shown in Fig. 4. Each such spiral wire 50 is wound so as to generate a plurality of forward or leading bends 50L and a plurality of rear or trailing bends 50T, and these bends or bights are equally spaced at a regular pitch RP, Fig. 4, which is to say that so far as the spiral turns of each spiral wire 50 are concerned these are of a regular or unvarying order. As shown in Fig. 5, each spiral wire 50 is preferably oval in section so as to afford when assembled a relatively flat supporting surface.

A particular spiral wire 50 is commonly related to a pair of adjacent rods 31, that is, a particular spiral wire 50 can be viewed as slipped on to a pair of adjacent rods 31 so that all of the leading bights 50L thereof will turn about a leading rod as 31A, Fig. 3, of the conveyor belt 30, whereas all of the trailing or rear bights 50T thereof will turn about the next adjacent trailing rod 31B. In view of this arrangement, each spiral wire 50 varies in size gradually from a wide outer diameter WD, Fig. 4, at one end to a narrow inner diameter ND at the other end, so that there is a complemental relation between the tapering nature of the spiral wires and the tapered separation space that exists between the rods 31.

Thus, the relation is such that in assembling the individual spiral wires 50 and the supporting rods 31, the trailing turns 50T of one wire and the leading turns 50L of the next adjacent trailing wire in the assembly will turn around a common rod. This common rod is indicated at 31B in Fig. 3, and it will be observed that the turns 50L and 50T on the rod 31B alternate. This has the effect of interlacing or meshing the wires 50 so that the shanks 50S thereof extend over and then under a pair of rods, thus filling up to a large extent the space that otherwise exists between the rods.

Once the belt 30 has been assembled to the extent that the association between the spiral wires and the rods 31 has been completed, the free ends of the wires are then brazed or welded to what constitutes the underside of the rods 31 to prevent the possibility of slippage occurring. However, it is important to point out that under the present invention free end portions 31E of substantial length are established for the rods 31, that is, the inner and outer end portions of the rods are not wound with a wire as 50, and in this way the rods 31 are freed for the desired accurate timing association with the sprockets 35 and 36.

It will be seen from the foregoing that in the present instance the problem of losing small articles at the outer circumference of a turn of a conveyor of the kind described has been successfully overcome in a relatively simple manner. The transverse rods are exposed at end portions so as to be capable of being driven in an accurately timed manner, and the spiral construction entails a minimum of assembly operations. In fact, the spiral wires are themselves not interconnected but are merely laced together by the transverse rods which can be easily slipped in place once the wires 50 have been laid out in the desired arrangement.

It will be appreciated that the term "wire" is used herein in a generic sense as applicable to any kind of material sufficiently ductile to be capable of generating the spiral form shown at 50, and sufficiently rigid when thus formed to serve as a support for articles to be conveyed thereby.

I claim:

In a conveyor belt of the kind described for a conveyor turn, a pair of spaced apart flexible endless bands, a plurality of transversely extending spaced apart straight rods having the opposite ends thereof connected to said bands, said rods diverging outwardly from narrow pitch spacing at the inner radius of the turn to wider pitch spacing at the outer radius of the turn, individual spiral wires being oval in section, each of said wires affording a series of regularly spaced leading bights embracing a leading one of said rods and a series of regularly spaced trailing bights embracing the next trailing one of said rods, said wires being tapered between the inner and outer ends thereof complemental to the pitch spacing of the rods and complementally related one to the other so that the leading and trailing bights of adjacent wires alternate on a common rod, each of said wires having opposite free ends secured to the undersides of the associated rods at a point spaced a substantial distance from the point of connection of the rods to the bands thereby providing free end portions of substantial length at opposite end portions of each of said rods between the free end of the associated wire and the point of connection with the associated band, and sprocket members mounted in position for drivingly engaging said free end portions of the rods to drive the conveyor belt in an accurately timed manner.

References Cited in the file of this patent
UNITED STATES PATENTS

| | | |
|---|---|---|
| 2,234,537 | Blackburn | Mar. 11, 1941 |
| 2,278,361 | Rapisarda | Mar. 31, 1942 |
| 2,633,975 | Koerber | Apr. 7, 1953 |